US005583677A

United States Patent [19]

Ito et al.

[11] Patent Number: 5,583,677

[45] Date of Patent: Dec. 10, 1996

[54] OPTICAL COMPENSATION SHEET AND ITS FABRICATION AS WELL AS LIQUID CRYSTAL DISPLAY DEVICE USING THE SAME

[75] Inventors: Yuji Ito; Ken Kawata; Nobuhiko Uchino; Masaki Okazaki, all of Minami-ashigara, Japan

[73] Assignee: Fuji Photo Film Co., Ltd., Minami-ashigara, Japan

[21] Appl. No.: 184,620

[22] Filed: Jan. 18, 1994

[30] Foreign Application Priority Data

| | | | |
|---|---|---|---|
| Jan. 18, 1993 | [JP] | Japan | 5-005823 |
| Jun. 23, 1993 | [JP] | Japan | 5-152345 |

[51] Int. Cl.[6] .......... G02F 1/1335

[52] U.S. Cl. .......... 349/118; 349/121

[58] Field of Search .......... 359/73, 63, 494, 359/500, 93, 96; 428/1; 430/20

[56] References Cited

U.S. PATENT DOCUMENTS

| | | | |
|---|---|---|---|
| 5,093,739 | 3/1992 | Aida et al. | 359/102 |
| 5,138,474 | 8/1992 | Arakawa | 359/73 |
| 5,246,747 | 9/1993 | Gillberg-La Force et al. | 428/1 |
| 5,246,748 | 9/1993 | Gillberg-Laforce et al. | 359/75 |
| 5,296,321 | 3/1994 | Kawanishi et al. | 430/20 |
| 5,301,045 | 4/1994 | Miller et al. | 359/63 |
| 5,359,439 | 10/1994 | Miller et al. | 359/76 |
| 5,375,006 | 12/1994 | Haas | 359/73 |

FOREIGN PATENT DOCUMENTS

| | | | |
|---|---|---|---|
| 63-239421 | 10/1988 | Japan | 359/73 |
| 2-230215 | 9/1990 | Japan | 359/63 |
| 4113301 | 4/1992 | Japan | 359/73 |

OTHER PUBLICATIONS

J. Haller "Ultraviolet Protecting Coating" IBM Tech. Discl. Bulletin—vol. 15—No. 2—1972–pp. 584–585.

Schadt et al. "Surface-Induced Parallel Alignment of Liquid Crystal by Lineraly Polymerized Photopolymers" Jpn. J. Appl. Phys., vol. 31—Jul. 1992—pp. 2155–2164.

*Primary Examiner*—William L. Sikes
*Assistant Examiner*—Tai V. Duong
*Attorney, Agent, or Firm*—Burns, Doane, Swecker & Mathis, LLP

[57] ABSTRACT

An optical compensation sheet for improving the visual characteristics of a liquid crystal display device is disclosed with a liquid crystal display device using such a sheet. The optical compensation sheet contains at least one photopolymerization substance that is sterically or structurally isomerized by light, and has negative uniaxiality, with the optic axis of the sheet intersecting the surface of the sheet. Application of this optical compensation sheet to a TN liquid crystal display device allows it the visual angle property to be improved, thereby providing a high definition liquid crystal display device.

7 Claims, 4 Drawing Sheets

Fig. 1
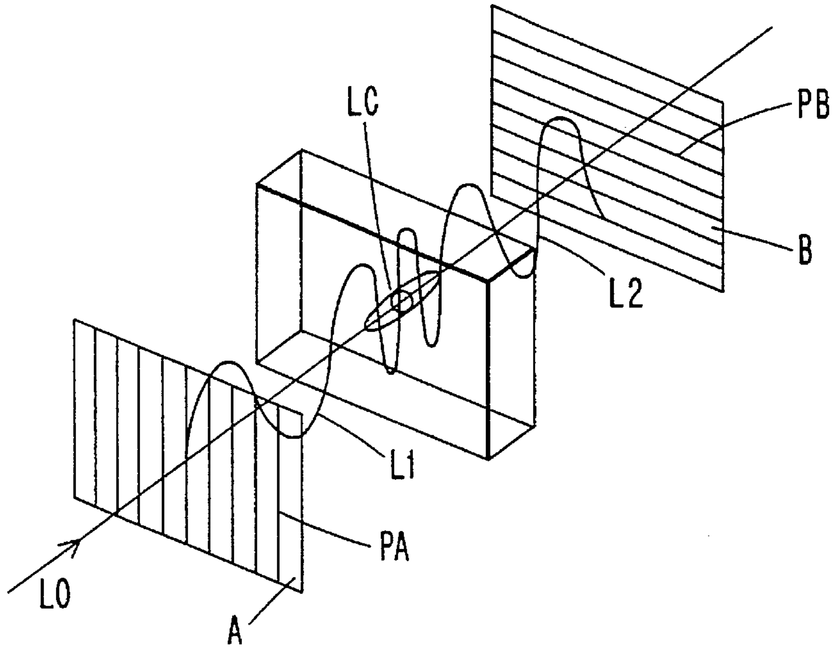
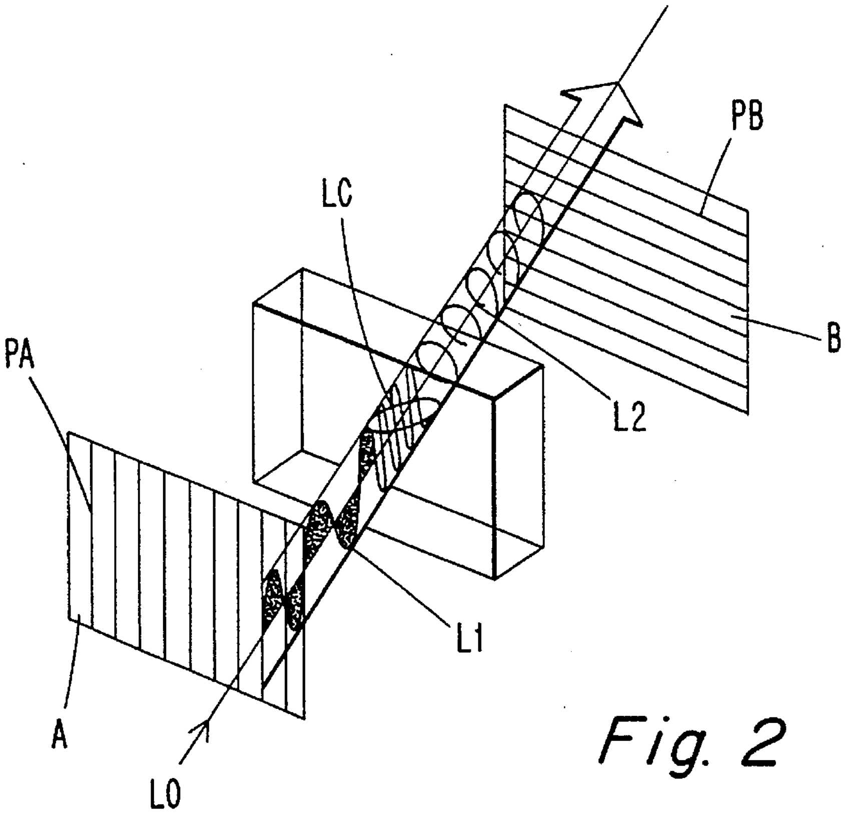
Fig. 2

(A) (B) (C)

OPTICAL COMPENSATION SHEET AND ITS FABRICATION AS WELL AS LIQUID CRYSTAL DISPLAY DEVICE USING THE SAME

BACKGROUND OF THE INVENTION

The present invention relates to an optical compensation sheet and its fabrication method as well as a liquid crystal display device using such a sheet. In particular, this invention is concerned with an optical compensation sheet useful for improving displayed contrast and the visual angle property of displayed color and a liquid crystal display device making use of such a sheet.

For display devices for word processors or personal computers, esp., miniature ones, liquid crystal display devices having the major advantages of low weight, small size and low power consumption are now widely used in place of CRTs. Most of currently available liquid crystal display devices (hereinafter LCDs for short) make use of twisted nematic liquid crystals. Devices made up of such liquid crystals work generally on two modes, a birefringent mode and an optical rotary mode.

In the case of the LCD working on the birefringent mode, sole use of a simple matrix form of electrode structure enables a massive display to be obtained by time-sharing addressing even in the absence of active elements such as thin-film transistors or diodes. This is because the twist angle of the molecular arrangement of liquid crystal is 90° or more, making the electro-optic property sharp. However, this LCD has a grave disadvantage of having a response speed as slow as a few hundred milliseconds, making gradation displays difficult, and so is still lower in display performance than a TFT or MIM display device using active elements.

The TFT or MIM type display work on the optical rotary mode wherein the liquid crystal molecules are twisted 90° (TN liquid crystal display elements). This display mode appears to be the most promising over other LCDs, because the response speed is as fast as scores of milliseconds and black-on-white displays can be easily achieved with high contrast. However, this display device is again still lower in display performance than CRTs, because of its own visual angle property that depending on the viewing direction there are variations in the displayed color and contrast.

As set forth in JP-A-4-229828, 4-258923, etc., it proposed to locate a phase difference film between a pair of polarizing plates and a TN liquid crystal cell, thereby making the angle of field large.

The phase difference film proposed in these specifications is substantially in phase with the surface of the liquid crystal cell in the vertical direction, and so cannot have any optical action on the liquid crystal cell, when it is just in front thereof. If tilted, however, the phase difference film then gives rise to a phase difference with respect to the liquid crystal cell, thereby making up for a phase difference occurring on the liquid crystal cell. Even with this method, however, the angle of field of the LCD is still less than satisfactory and, in this regard, there is left much to be desired. Especially when used on cars or as an alternative to CRTs, conventional LCDs are of no use in terms of the angle of field. As disclosed in JP-A-4-366808, 4-366809 and 4-366810, it has also been proposed to use a chiral nematic liquid crystal with an inclined optic axis as a phase difference film, thereby improving the angle of field. However, this leads to a costly, very heavy bilayer liquid crystal system.

A primary object of the present invention is to make some considerable improvement in the narrow angle of field resulting from the fact that the polarized state of light propagating through a liquid crystal cell varies depending on the incident direction, thereby achieving a wide angle-of-field property alternative to that of a CRT with low weight and at low cost.

SUMMARY OF THE INVENTION

According to one aspect of the invention, there is provided an optical compensation sheet containing at least one photoisomerizable substance and having optical anisotropy.

According to another aspect of the invention, there is provided an optical compensation sheet containing at least one photoisomerizable substance and a liquid crystalline compound and having optical anisotropy.

According to yet another aspect of the invention, there is provided an optical compensation sheet containing a low-molecular compound or polymer including at least a photoisomerizable functional group and capable of forming a liquid crystal and having optical anisotropy.

According to still another aspect of the invention, there is provided an optical compensation sheet having negative uniaxiality, with the optic axis intersecting the surface of the sheet at an angle other than a right angle.

According to a further aspect of the invention, there is provided a method of fabricating an optical compensation sheet by irradiating a sheet containing at least one photoisomerizable substance with light, thereby allowing the sheet to exhibit optical anisotropy.

According to a still further aspect of the invention, there is provided a method of fabricating an optical compensation sheet by obliquely irradiating a sheet containing at least one photoisomerizable substance with linearly polarized light, thereby controlling the angle of the optic axis.

According to a still aspect of the invention, there is provided a liquid crystal display element including a liquid crystal cell having a liquid crystal sandwiched between two electrode substrates, two polarizing plates located on both sides of the liquid crystal cell, and at least one optical compensation sheet located between the liquid crystal cell and the polarizing plate or plates.

BRIEF DESCRIPTION OF THE DRAWINGS

FIG. 1 is a schematic of a conventional TN type liquid crystal display element, and illustrates how light striking vertically the display surface is transmitted.

FIG. 2 is a schematic of a conventional TN liquid crystal display element, and illustrates how light striking obliquely the display surface is transmitted.

DESCRIPTION OF THE PREFERRED EMBODIMENT

Figure 3:
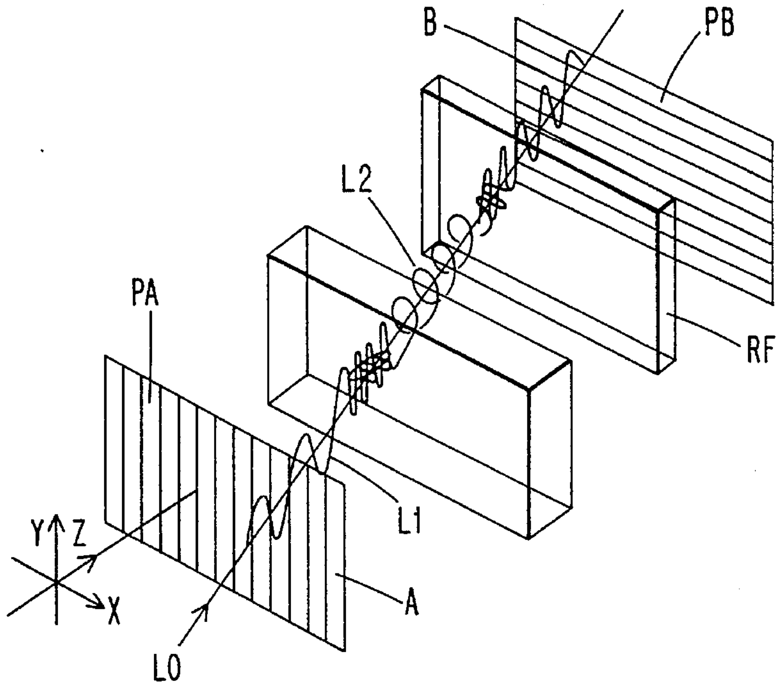
FIG. 3 is a schematic of one embodiment of the construction of the liquid crystal display element according to the invention.

In the following description, the present invention will be explained with reference to the TN liquid crystal display elements shown in the drawings. FIGS. 1 and 2 are schematics of how light propagating through the liquid cells is polarized when sufficient voltages higher than the threshold voltage are applied thereto. The transmittance property of light, especially that in the presence of an applied voltage, contributes greatly to the field-of-angle property of contrast. Thus, explanation will now be given to the liquid crystal cell in the presence of an applied voltage. FIG. 1 is a schematic of how light vertically incident on the liquid crystal cell is polarized. When natural light LO strikes vertically a polarizing plate A having polarizing axes PA, the light passing through the polarizing plate A becomes linearly polarized light L1, which is almost completely cut off by a polarizing plate B.

When a large-enough voltage is applied to the TN liquid crystal cell, the liquid crystal molecules line up, as schematically shown by one liquid crystal molecule LC in FIG. 1. If the major axis of the liquid crystal molecule LC in the liquid crystal cell is parallel with the path taken by light, there is then no difference in the index of refraction in the incident plane (vertical to the path taken by light); there is no phase difference between ordinary light and extraordinary light propagating through the liquid crystal cell, so the linearly polarized light passing through the LC cell propagates, while it remains linearly polarized, even upon passing through the liquid crystal cell. When the polarizing axes PB of the polarizing plate B are set at right angles with respect to those of the plate A, the linearly polarized light passing through the liquid crystal cell cannot pass through the polarizing plate B, so the viewer sees a dark spot on the display.

FIG. 2 is a schematic of how light striking obliquely the liquid crystal cell is polarized. When natural light LO is obliquely incident on the liquid crystal cell, linearly polarized light L1 passing through a polarizing plate A becomes almost linearly polarized light but, in some cases, it becomes elliptically polarized light although depending on the characteristics of the polarizer. In this case, the anisotropy of the index of refraction of the liquid crystals gives rise to a difference in the index of refraction on the incident plane of the liquid crystal cell, so light L2 passing through the liquid crystal cell is elliptically polarized and is not cut off by a polarizing plate B. Thus, oblique incidence is not preferable, because the cutoff of light is insufficient in the dark state, incurring a large diminishment of contrast.

The present invention has for its object to prevent any diminishment of contrast in the case of such oblique incidence and so improve the visual angle property.

Referring to FIG. 3, there is shown one example of the construction according to the invention. Between a polarizing plate B and a liquid crystal cell there is located an optically anisotropic element with the optic axis at an angle with respect to the normal line of the liquid crystal cell. This anisotropic element RF is a birefringent member that is more largely polarized as the angle of incidence of light with respect to the optic axis increases. When light is obliquely incident on the liquid crystal display element of such construction, as in FIG. 2, elliptically polarized light L2 passing through the liquid crystal cell is modulated to the original linearly polarized light by the phase delay action of the optically anisotropic element RF, so making it possible to obtain a good-enough liquid crystal display element that can achieve the same transmittance in various oblique incidence fashions and is independent on the visual angle.

The following appear to be the reason some considerable improvement in the field of angle of a liquid crystal display element is achieved by the present invention.

A normally white mode is adopted for most of TN-LCDs. Referring to the field-of-angle property on this mode, the transmittance of light from a dark part of the display increases considerably with an increase in the visual angle, resulting in a sharp contrast drop.

A black display is obtained in the presence of an applied voltage. At this time, the TN liquid crystal cell can be taken as an optically anisotropic member that is of positive uniaxiality with the optic axis at some small angle with respect to the normal direction of the surface of the cell. In the case of middle gradation, that optic axis is considered to be at a larger angle with respect to the normal direction of the LC cell.

When the optic axis of the liquid crystal cell is at an angle with respect to the normal direction of the surface of the liquid crystal cell, it is expected that an optically anisotropic member with the optic axis lying in the normal direction cannot make full compensation for it. If the liquid crystal cell can be taken as an optically anisotropic member of positive uniaxiality, it is then preferable to use an optically anisotropic member of negative uniaxiality for its compensation. For these reasons, it is presumed that by use of an optically anisotropic member of negative uniaxiality with the optic axis at an angle with respect to the normal direction is it possible to achieve some considerable improvement in the field-of-angle property.

In the ensuing description, the present invention will now be explained more illustratively.

The term "photoisomerizable substance" used in the present disclosure is understood to refer to a substance that can be sterically or structurally isomerized by light. More preferably, this substance should be back-isomerized by light of different wavelength or heat. Some of the compounds used to this end are well known as photochromic compounds that undergo a structural change with a tone change in the visible region. Illustratively but not exclusively, mention is made of azobenzene compounds, benzaldoxime compounds, azomethine compounds, stilbene compounds, spiro-pyran compounds, spiro-oxazine compounds, fulgide compounds, diarylethene compounds, cinnamic acid compounds, retinal compounds, and hemithioindigo compounds.

The photoisomerizable compounds useful for the present invention, i.e., the compounds having a photoisomerizable functional group, may be in the form of either low-molecular compounds or polymers. The polymers can perform their own function, regardless of whether the photoisomerizable group is located in the main chain or in the side chain. The polymers may be either homo- or co-polymers. However, the copolymers should preferably have a degree of copolymerization good enough to properly regulate the physical properties such as the ability to be isomerized by light, and Tg.

The compounds having a photoisomerizable functional group may at the same time be liquid crystalline compounds to be described later; that is, the liquid crystalline compounds may have a photoisomerizable functional group in their molecule For details of these compounds, see "Polymers", 41, (12), p. 884, (1992); "Chromic Material and Its Application" edited by CMC, p. 221; "Mechanochemistry" edited by Maruzen, p. 21; "Monographs on Polymers", Vol. 147, No. 10, p. 771 (1991); and so on.

These photoisomerizable compounds may have substituents such as atoms, e.g., halogen atoms, and groups, e.g., alkyl, alkenyl, alkinyl, aryl, hetrocyclic, cyano, carboxyl, carbamoyl, alkoxycarbonyl, aryloxycarbonyl, acyl, amino, alkylamino, arylamino, acylamino, alkylsulfonylamino, arylsulfonylamino, ureido, alkoxy, aryloxy, acyloxy, alkylsulfonyloxy, arylsulfonyloxy, alkylthio, arylthio, alkylsulfonyl, arylsulfonyl, sulfo, and sulfamoyl groups. Although not critical, these substituents are preferably located in the major axis direction of the photoisomerizable molecule.

Photoisomerizable group-containing compounds T1 to T36 preferably used in the present invention will be enumerated below. However, it is noted that the photoisomerizable compounds according to the invention are not limited to them in terms of structure.

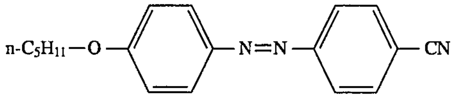

T1

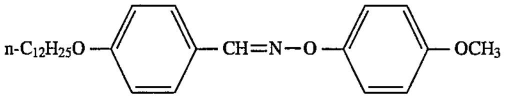

T2

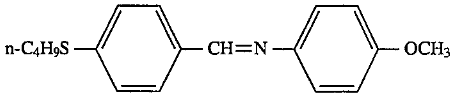

T3

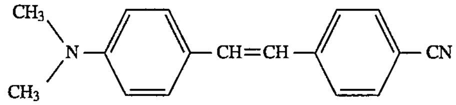

T4

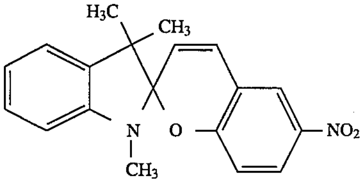

T5

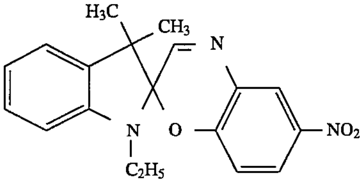

T6

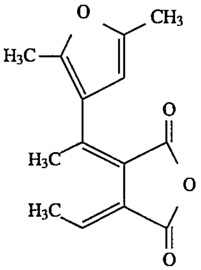

T7

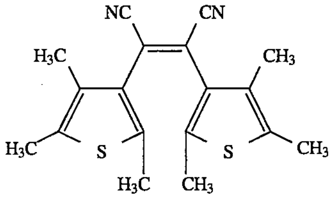

T8

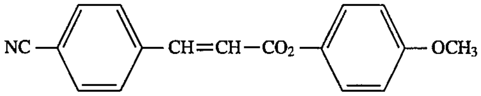

T9

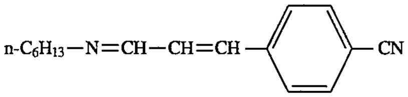

T10

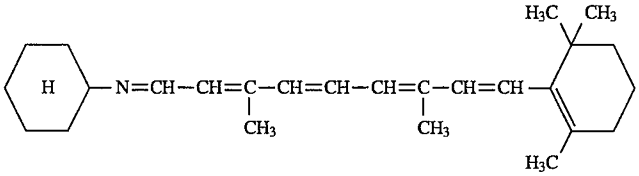

T11

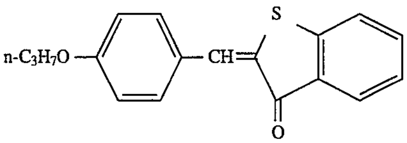

T12

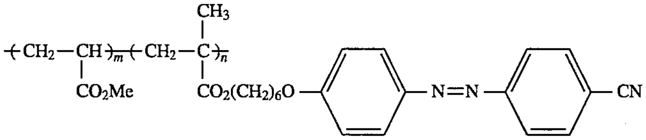

T13

-continued
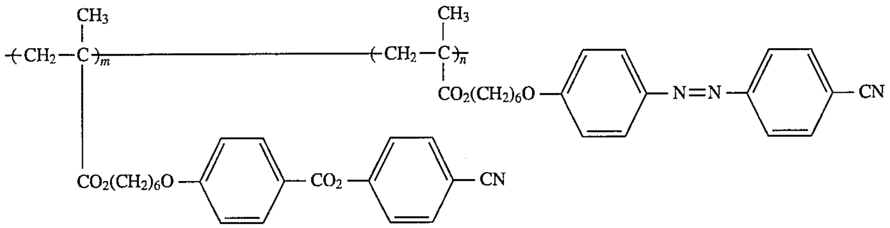
T14
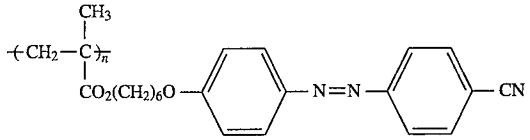
T15
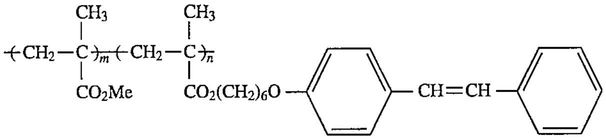
T16
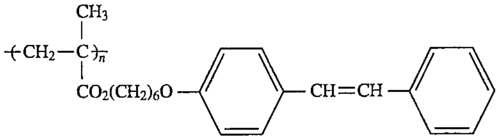
T17
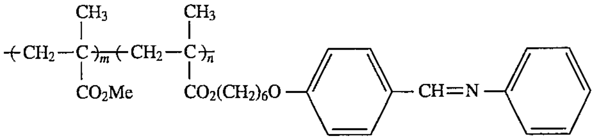
T18
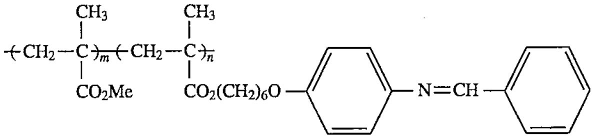
T19
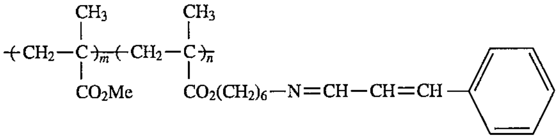
T20
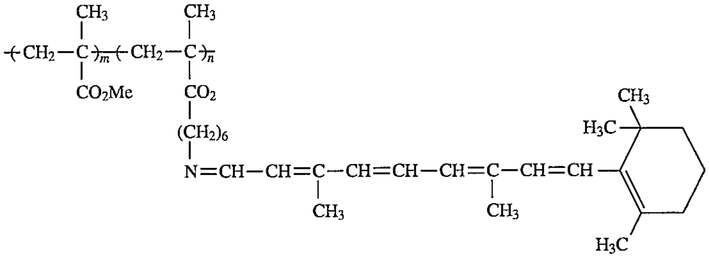
T21
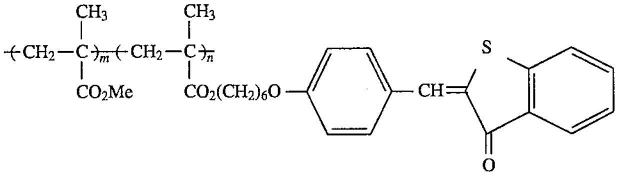
T22

-continued
T23
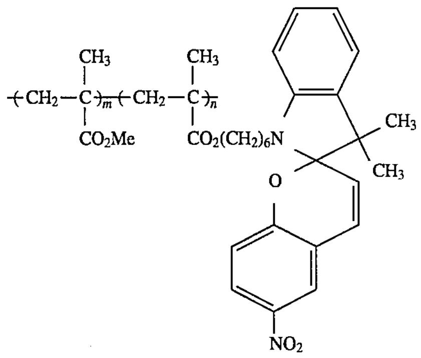
T24
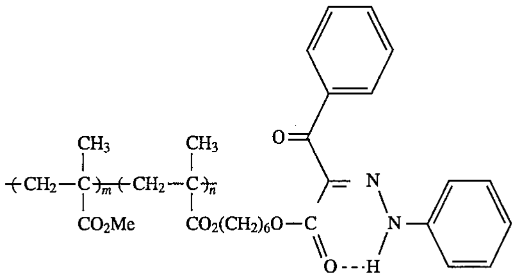
T25
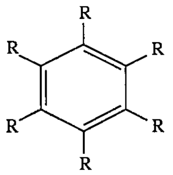
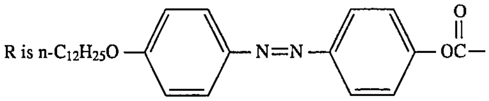
T26
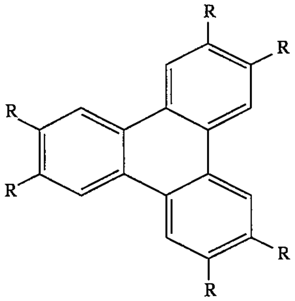
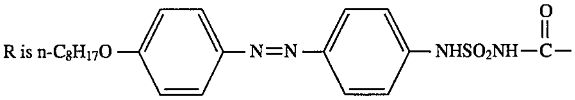
T27
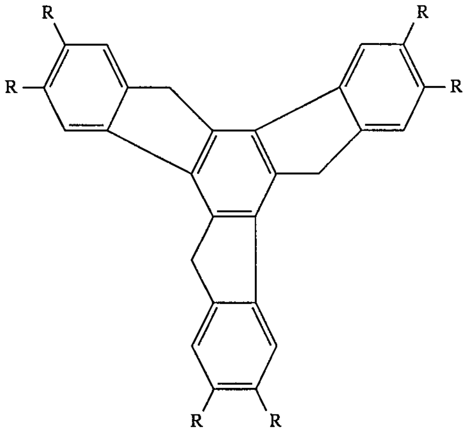
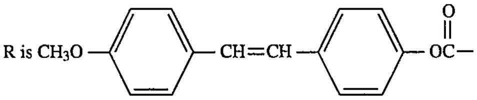
T28
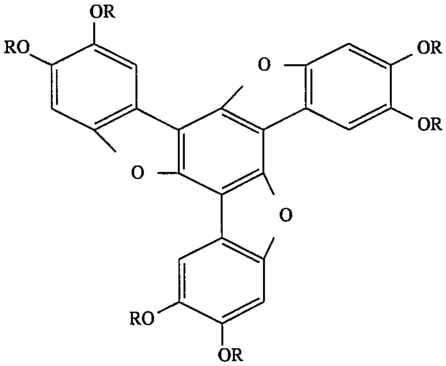
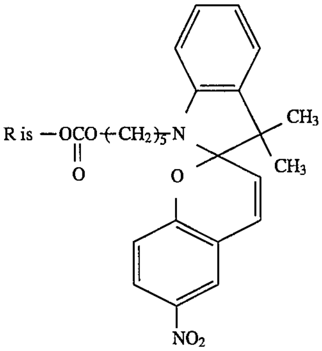

-continued
T29
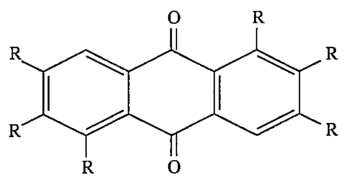
R is
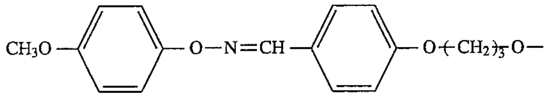
T30
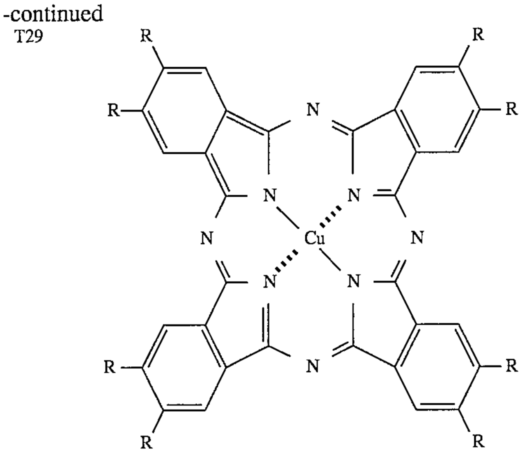
R is
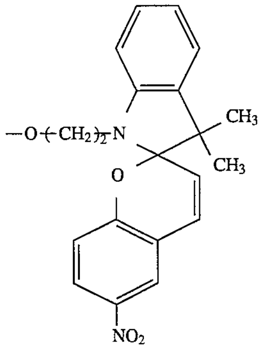
T31
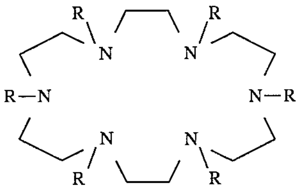
R is
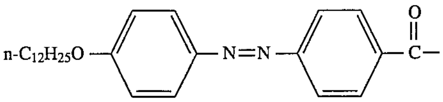
T32
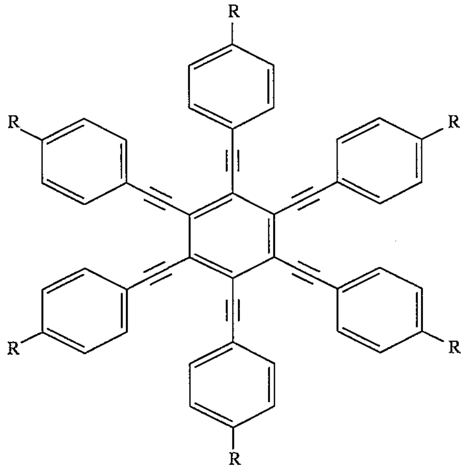
R is
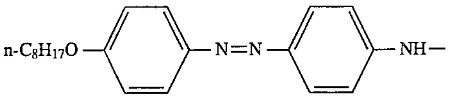

-continued

T33

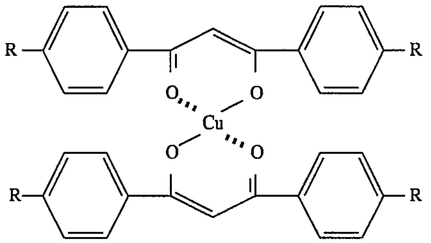

R is 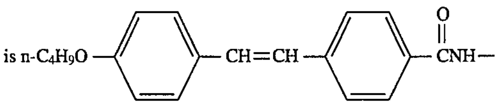

T34

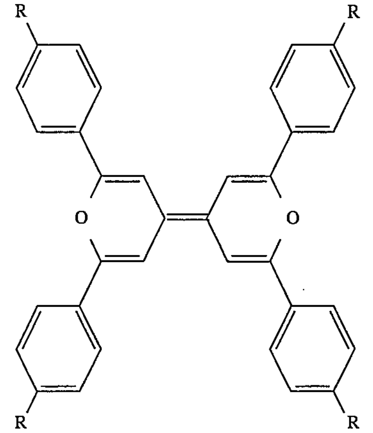

R is 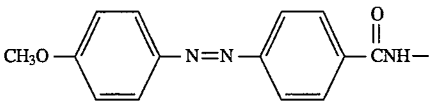

T35

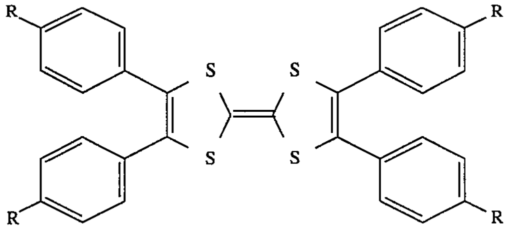

R is 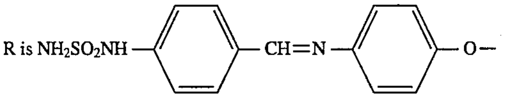

T36

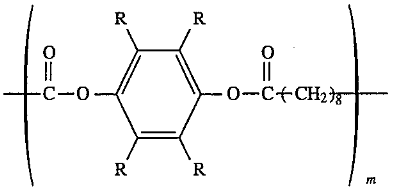

R is 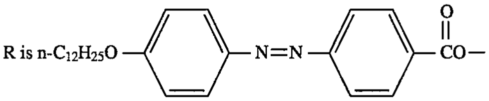

In the present disclosure, the term "liquid crystalline compound" or "compound capable of forming liquid crystals" is understood to include a compound that does not necessarily possess the liquid crystalline properties in a strict sense; that is, a compound that does not meet the essential conditions that it must be an apparently flowable, turbid liquid in a certain temperature range and, at the same time, show birefringence characteristic of an optically anisotropic crystal. The sole condition is that the compound must behave in much the same manner as the behavior of the rearrangement of the photoisomerizable group in the coexisting photoisomerizable substance. In other words, the compound used to achieve the object of the present invention may have in its molecule a typical molecular structure (mesogen) that forms any one of nematic, smectic, cholesteric and discotic liquid crystal phases.

As the mesogens mentioned above, use may typically be made of azomethine, phenylazo, phenylazoxy, benzoic acid ester, biphenyl, terphenyl, cyclohexylcarboxylate, phenylcyclohexane, biphenylcyclohexane, pyrimidine, dioxane, cyclohexylcyclohexane ester, cyclohexylethyl, tolane, 2,3-difluorophenylene, alkenyl, and cyclohexyl groups or their composite or connected group for the nematic and smectic phases. For the cholesteric phase a cholesterol derivative ester may be mentioned. For the discotic phase mention may be made of hexa-substituted benzene, 2,3,6,7,10,11-hexa-substituted triphenylene, 2,3,7,8,12,13-hexa-substituted truxene, hexa-substituted trioxatruxene, 1,2,3,5,6,7-hexa-substituted anthraquinone, octa-substituted phthalocyanine or polyphillin, hexa-substituted macrocyclene, bis(1,3-diketone)copper complex, tetraarylbipyranilidene, tetrathiafulvalene, and inositol.

The liquid crystalline compounds used in the present invention may be either low-molecular compounds or polymers. When they are polymers, the mesogens may be contained either in the main chains or in the side chains. The polymers may be either homopolymers or copolymers. In the latter case, the degree of copolymerization may be such selected as to make the physical properties, e.g., orientation and Tg, of the polymers preferable. For details of the mesogens contained in these compounds, see "Basis & Application of Liquid Crystals", Kogyo Chosa-kai, p. 121 (1991), "Liquid Crystal Device Handbook", Japan Society for the Promotion of Science, the 142 Committee, p. 116, "Mol. Cryst. Liq. Cryst.", 106, p. 121 (1984), etc. These low-molecular compounds or polymers may contain the photoisomerizable groups in their molecules. These molecules may also contain substituents such as atoms, e.g., halogen atoms, and groups, e.g., alkyl, alkenyl, alkinyl, aryl, hetrocyclic, cyano, carboxyl, carbamoyl, alkoxycarbonyl, aryloxycarbonyl, acyl, amino, alkylamino, arylamino, acylamino, alkylsulfonylamino, arylsulfonylamino, ureido, alkoxy, aryloxy, acyloxy, alkylsulfonyloxy, arylsulfonyloxy, alkylthio, arylthio, alkylsulfonyl, arylsulfonyl, sulfo, and sulfamoyl groups. Of these substituents, preference is given to those making the intrinsic index of double refraction large, e.g., cyano or alkoxy groups, or halogen atoms. Set out below are liquid crystalline compounds T37–T95 preferably used in the present invention.

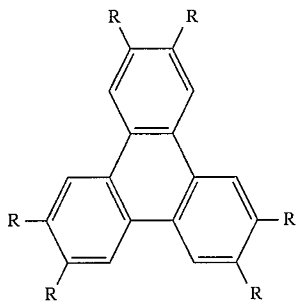
R is 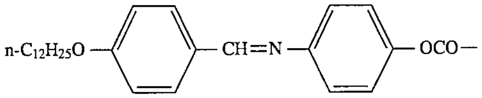
T37
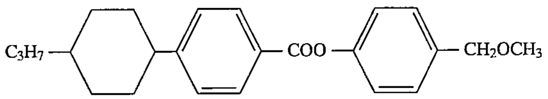
T38
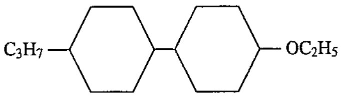
T39
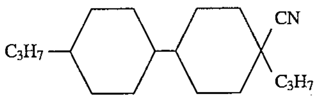
T40
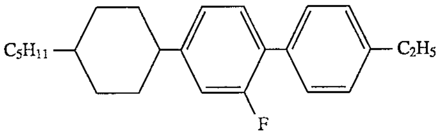
T41
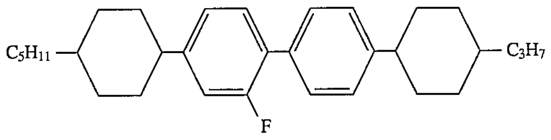
T42
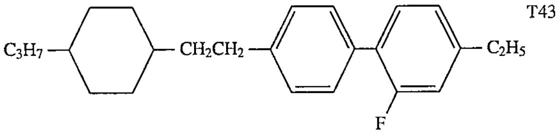
T43
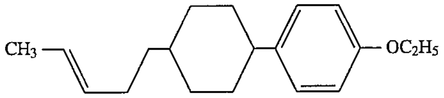
T44
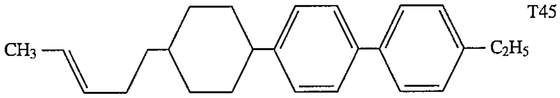
T45
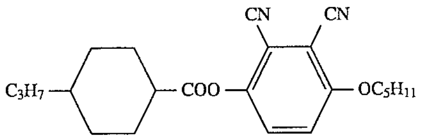
T46
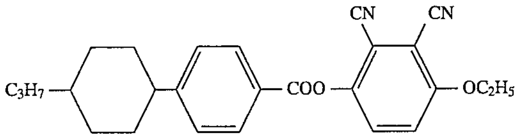
T47
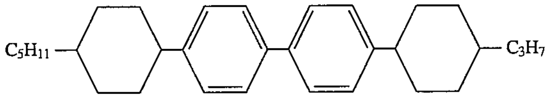
T48
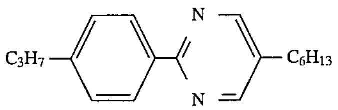
T49
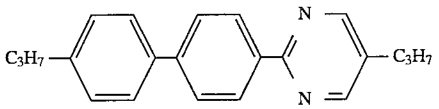
T50
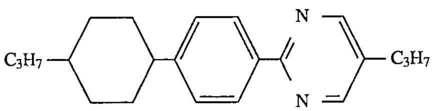
T51
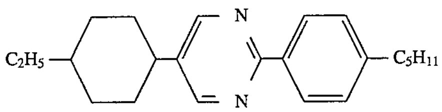
T52
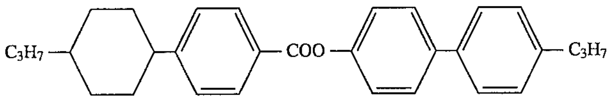
T53
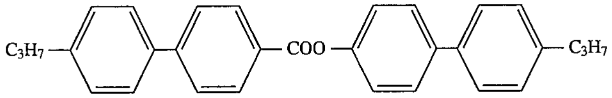
T54
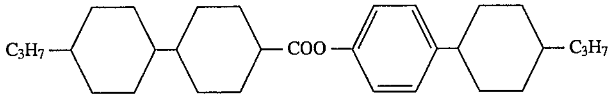
T55

-continued
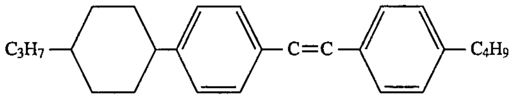
T56
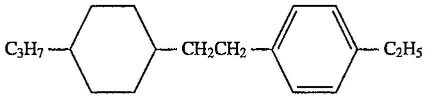
T57
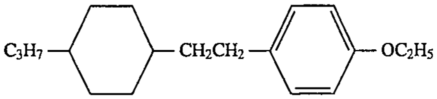
T58
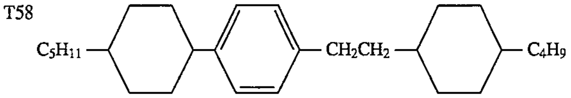
T59
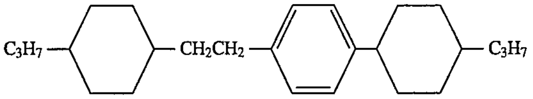
T60
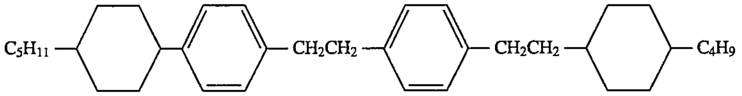
T61
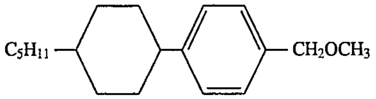
T62
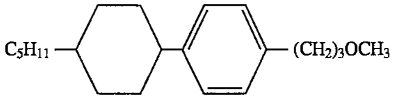
T63
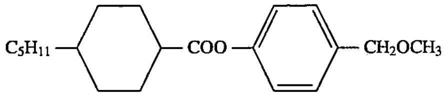
T64
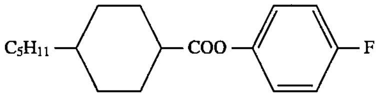
T65
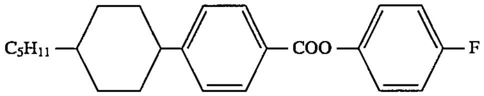
T66
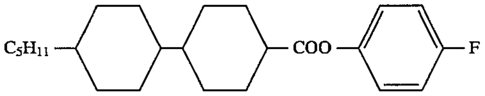
T67
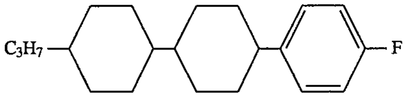
T68
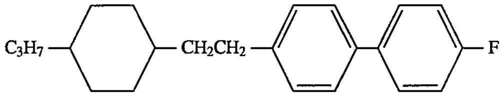
T69
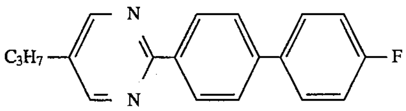
T70
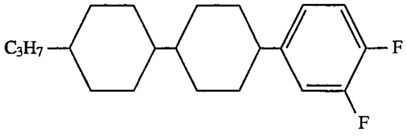
T71
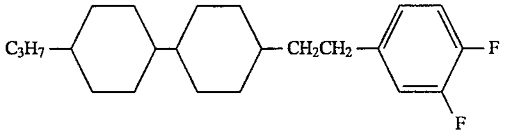
T72
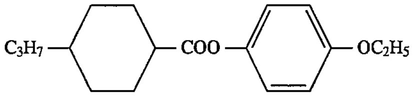
T73
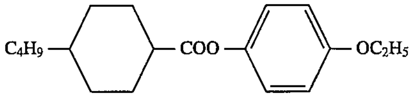
T74
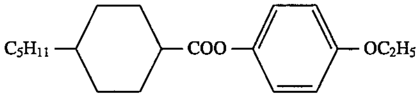
T75
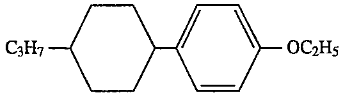
T76
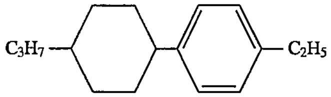
T77
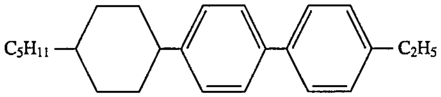
T78
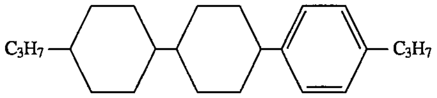
T79
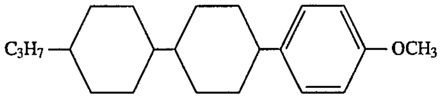
T80
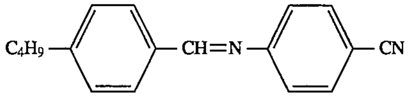
T81
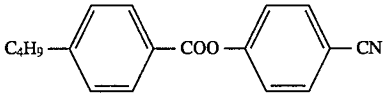
T82
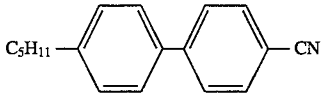
T83

-continued

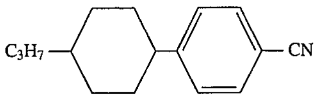
T84

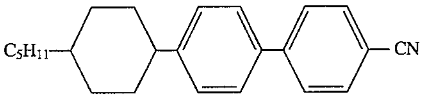
T85

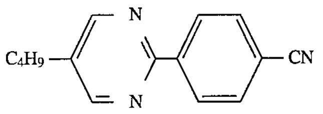
T86

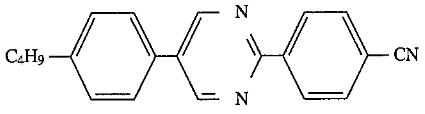
T87

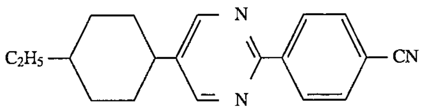
T88

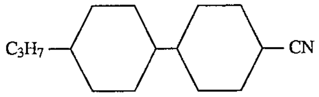
T89

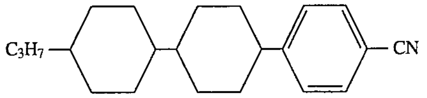
T90

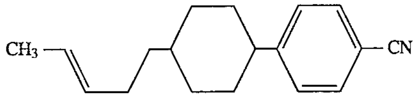
T91

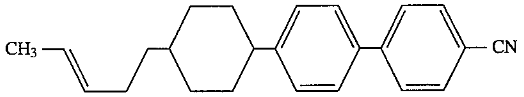
T92

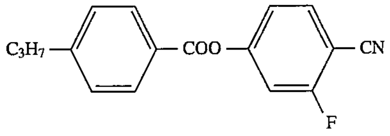
T93

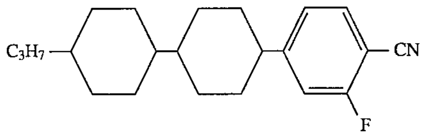
T94

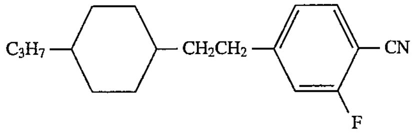
T95

In the present invention, the negative uniaxiality is defined by $$n\alpha < n\beta = n\gamma$$

Here nα, nβ and nγ are the triaxial indices of refraction of an optically anisotropic sheet, and meet the following relation:

$$n\alpha < n\beta < n\gamma$$

To put it another way, the negative uniaxiality is understood to mean that the index of refraction in the optic axis direction is smallest. It is noted, however, that the value of nβ is not always strictly equal to the value of nγ; that is, they may be nearly equal to each other. Specifically, if $|n\beta - n\gamma|/|n\beta - n\alpha| \leqq 0.2$, no practical problem arises. To achieve some considerable improvement in the field-of-angle property of a TFT or TN liquid crystal cell, it is preferable that the optic axis of the sheet be inclined at an angle of 5 to 50 degrees, particularly 10 to 40 degrees and most particularly 10 to 30 degrees with respect to the normal direction of the surface of the sheet. Moreover, it is preferable that the sheet conform to the following condition:

$$100 \leqq (n\beta - n\alpha) \times D \leqq 400 \text{ nm}$$

where D is the thickness of the sheet.

Reference will now be made to how to fabricate the optical compensation sheet according to the present invention.

First, a sheet containing at least one photoisomerizable substance is formed. While the sheet according to the present invention may assume on a form of what is generally called a sheet), it is understood that it may take many other forms inclusive of film, film-like and plate-like forms. In addition, it may be coated on a support in the form of a film. It is preferable that the sheet be up to 300 μm, particularly up to 100 μm and most particularly up to 20 μm in thickness. Preferably but not by way of limitation, the sheet is formed by generally known methods such as solution casting, melt film forming and coating.

The sheet according to the present invention may be made up of the photoisomerizable substance alone, or may alternatively be mixed with other material. However, it is noted that the sheet should have a light transmittance of preferably at least 70% and more preferably at least 85%.

To form the sheet by coating techniques, a solution containing at least one photoisomerizable substance is first prepared. Then, this solution is coated on a support having a light transmittance of at least 70% with the use of a coater using a wire bar or the like. In this case, it is preferable that the support material be almost optically isotropic, in addition to having a good-enough light transmittance. It is therefore preferable to coat the solution on a support made up of a material having a small intrinsic index of double refraction such as commercially available materials sold under the trade names of Zeonex (Nippon Zeon Co., Ltd.), ARTON (Nippon Synthetic Rubber Co., Ltd.) and Fujitach (Fuji Photo Film Co., Ltd.), etc. However, even a material having a large intrinsic index of double refraction, e.g., polycarbonate, polyarylate or polysulfone may favorably be used as an optically isotropic support, if the molecular orientation is inhibited during film formation.

Specifically, the negative uniaxiality, combined with the refractive index property that allows the optic axis to be inclined with respect to the normal direction of the sheet containing at least one photoisomerizable substance, is achieved by the oblique irradiation of the surface of the sheet with linearly polarized light. In this case, the optic axis can arbitrarily be controlled by controlling the angle of inclination of the incident light.

This will be explained at great length. It has now found that when linearly polarized light is propagated through the sheet containing at least one photoisomerizable substance, the optic axis is formed in the direction of vibration of the polarized light. It is presumed that portions capable of being photoisomerized are caused to line up radially and almost uniformly in every direction in the plane normal to the optic axis. The direction of the optic axis lies in the direction of vibration with respect to the direction of propagation within the sheet, and is different from the direction of vibration of the linearly polarized light incident on the sheet. However, since the direction of propagation of the incident polarized light and the direction of the polarized light through the sheet follow Snell's law, it is possible to control the direction of the optic axis by controlling the direction of propagation of the incident polarized light.

Now consider the process of the rearrangement of the photoisomerizable substance according to the present invention by linearly polarized light. As already noted, the photoisomerizable substance according to the present invention is sterically or structurally isomerized by light and, preferably, is back-isomerized by light of different wavelength or heat. By way of example, an azo dye undergoes frequent repetition of cis-trans isomerization by irradiation with light or heat. When the irradiation light is linearly polarized light, the azo groups with the absorption axes lying in the direction of vibration of the light line up and thus absorb the light. In this course, however, some azo groups line up accidentally in the direction that is completely or nearly vertical to the direction of vibration of the light. Since the light is not absorbed at all, these azo groups remain fixed in that direction. This is the process of the rearrangement.

More illustratively, reference will now be made to the case where the photoisomerizable substance is azobenzene.

Figure 4:
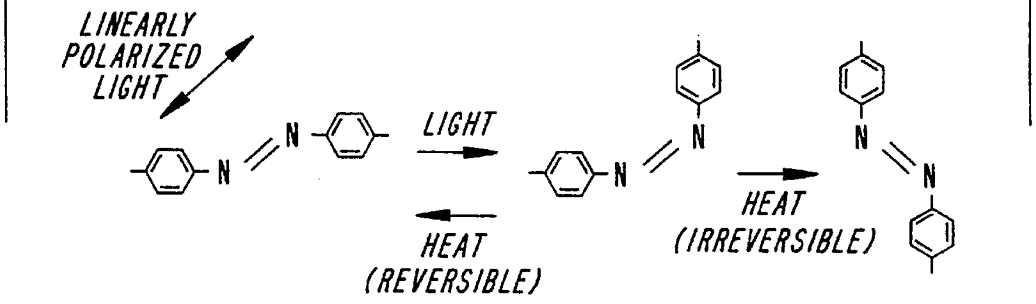
FIG. 4 is a schematic of the mechanisms by which a photoisomerizable substance is rearranged by polarized light.

As illustrated in FIG. 4, trans-azobenzene (A) is converted by photoisomerization to the cis configuration (B) upon irradiated with linearly polarized light almost in agreement with the light absorption axis. (B) changes to the trans configuration (A) or (C). (C) is no longer affected by light and thus remains stabilized, because its absorption axis is virtually normal to the linearly polarized light. (C) can be stabilized elsewhere in the plane normal to the axis of the linearly polarized light, and so provides an optically anisotropic substance with the axis of polarization in agreement with the optic axis. Another reason the azobenzene is made negatively uniaxial appears to be that a large refractive index is obtained in the direction of the absorption axis on the side chain of the azobenzene than in the direction of the main chain.

In short, when a sheet containing a randomly oriented azobenzene is irradiated with linearly polarized light, the number of the azo groups caused to line up in the direction vertical to the direction of vibration of the linearly polarized light increases with time. The direction of this rearrangement lies in the plane vertical to the direction of vibration of the linearly polarized light (as shown by the double headed arrow), in which plane the azo groups are caused to line up randomly (or planar arrangement). In the sheet after rearranged, the azo groups are caused to line up in the plane normal to the direction of vibration of the incident polarized light, and this is presumed to induce low birefringence or negative unaxiality in the vertical direction (of vibration of the light).

As the light source for linearly polarized light use is preferably made of those having a wide wavelength region, e.g., mercury, halogen or xenon lamps, although the wavelength at which photoisomerization takes place differs depending on material. The intensity (illuminance) of the linearly polarized light used for irradiation has a large influence on the yield of quantization by the photoisomerizable substance, the temperature of the sheet while irradiated with the light, etc., and so should preferably be determined depending on the properties of each sheet. However, when visible light is used, it should have an intensity of preferably at least 500 lux, more preferably at least 5,000 lux.

The temperature of the sheet, while irradiated with polarized light, should preferably lie in the vicinity of the glass transition point, Tg, of the polymer forming the sheet and, more precisely, lie in the range given by $$(Tg-30^\circ\ C.)<(\text{temperature of the sheet while irradiated})<(Tg+50^\circ\ C.)$$

This is because when the temperature of the sheet while irradiated is much lower than Tg, the motion of the molecules in the sheet is so limited that photoisomerization is inhibited, thus making birefringence unlikely to occur, whereas at a temperature much higher than Tg the thermal motion of the molecules makes a large contribution to relaxation, again making birefringence unlikely to occur.

The durability property of the optically anisotropic substance can be improved by subjecting the photoisomerizable substance to a chemical deactivation treatment.

The photoisomerizable substance is isomerized by the absorption of light. For this reason, when the sheet, to which the desired optical properties have already been imparted, is placed in an environment irradiated with light, it is most likely that the sheet undergoes an additional isomerization, and so varies in the optical properties with the lapse of time. To avoid such a phenomenon, the portions that absorb light, i.e., the conjugated chain structure portions such as azo, imino and vinyl groups may be chemically deactivated by decomposition due to cleavage by oxidation, reduction or reactions or elution, thereby improving the durability property.

The present invention will now be explained in more detail with reference to some illustrative examples.

EXAMPLE 1

The photoisomerizable substance T37 having a weight-average molecular weight of about 20,000, calculated as styrene, was dissolved in methylene chloride to prepare a 20% by weight solution, which was in turn coated on a glass plate support with the use of a doctor blade, thereby obtaining a 15 μm-thick sheet. Then, the sheet was placed in an oil bath for irradiation with linearly polarized light, using a polarized light irradiator shown in FIG. 6, thereby obtaining an optical compensation sheet. The conditions applied are as follows:

Oil with a refractive index of 1.52: 45° C.

Angle θ of incidence of light on the optical compensation sheet: 80°

Illuminance as measured on the surface of the optical compensation sheet: 20,000 lux Irradiation time: 1 hour Before and after irradiated with the polarized light, the optical compensation sheet was measured in terms of the dependence of retardation on angle on the transmission mode, using ellipsometer AEP-100 (Shimadzu Corporation). From this value, the optimum triaxial indices of refraction and the angle of inclination of the optic axis with respect to the normal direction of the sheet were found by calculation. The results are set out in Table 1.

EXAMPLE 2

An optical compensation sheet was made following Example 1 with the exception that the angle of incidence of light on the sheet blank was 50° and the irradiation time was 15 minutes. As in Example 1, the triaxial indices of refraction and the direction of the optic axis were found. The results are shown in Table 1.

EXAMPLE 3

An optical compensation sheet was made following Example 2 with the exception that the angle of incidence of light on the sheet blank was 20°. As in Example 1, the triaxial indices of refraction and the direction of the optic axis were found. The results are shown in Table 1.

EXAMPLE 4

The photoisomerizable substance (T26) and the liquid crystalline compound (T71 with a weight-average molecular weight of about 30,000, calculated as styrene) were dissolved at a weight ratio of 1:5 in methylene chloride to prepare a 20% by weight solution. Using a doctor blade, the solution was coated on a glass plate support to obtain a 15 μm-thick sheet. The sheet was irradiated with linearly polarized light under similar conditions to those used in Example 1 with the exception that the temperature of the oil in the oil bath was 160° and the irradiation time was 40 minutes, thereby preparing an optical compensation sheet. As in Example 1, the triaxial indices of refraction and the direction of the optic axis were found. The results are given in Table 1.

EXAMPLE 5

Figure 5:
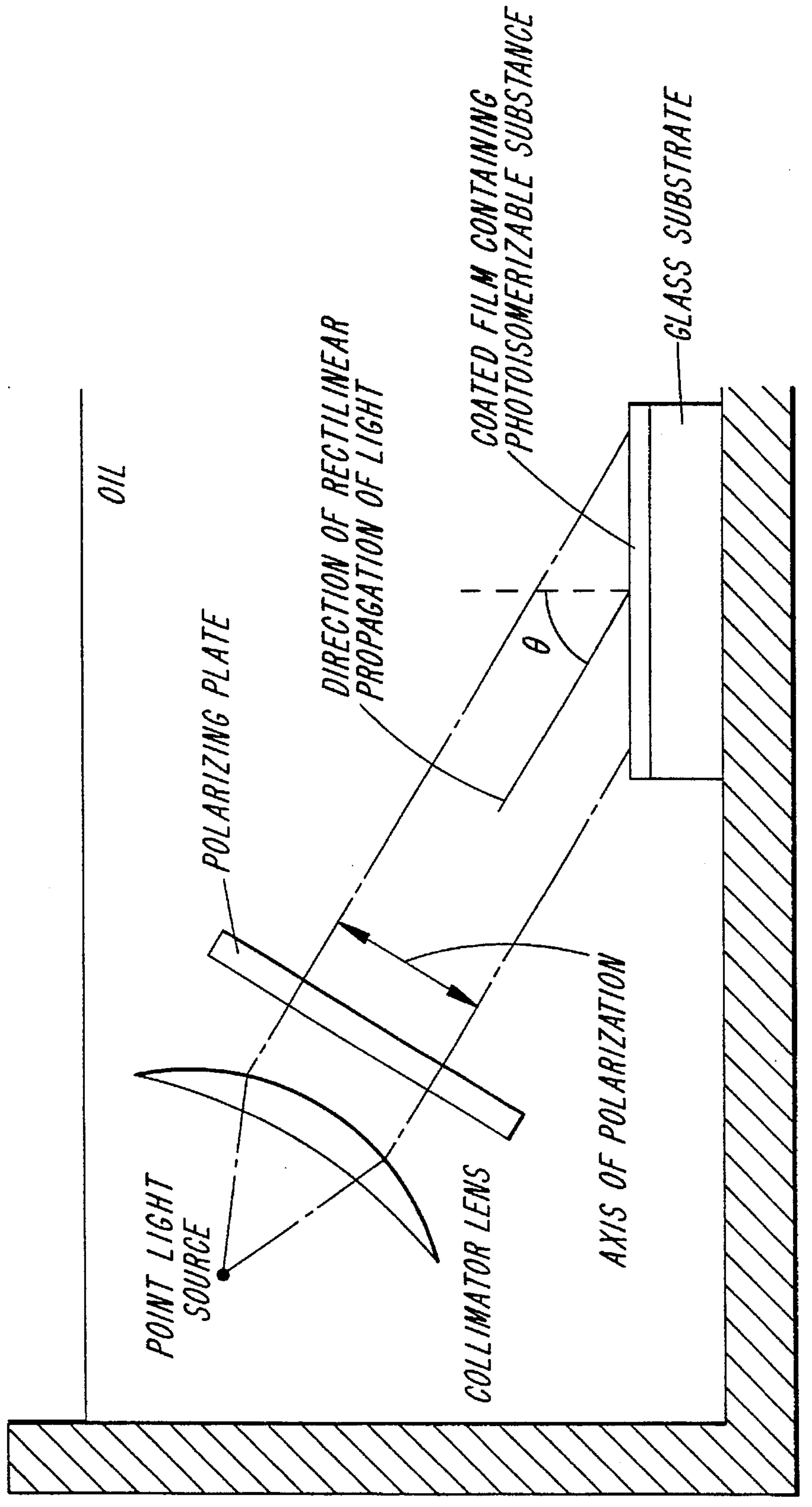
FIG. 5 is an illustration of the construction of the liquid crystal display element used in the present embodiment.

The photoisomerizable substance (T-13) having a weight-average molecular weight of about 5,000, calculated as styrene, was dissolved in methylene chloride to prepare a 20% by weight solution, which was in turn coated on a glass plate support with the use of a doctor blade, thereby obtaining an 8 μm-thick sheet. Then the sheet was placed in an oil bath for irradiation with linearly polarized light, using a polarized light irradiator shown in FIG. 5, thereby obtaining an optical compensation sheet.

The conditions applied are as follows.

Oil with a refractive index of 1.52: 55° C.

Angle θ of incidence of light on the optical compensation sheet: 80°

Illuminance as measured on the surface of the optical compensation sheet: 20,000 lux Irradiation time: 1 hour

COMPARATIVE EXAMPLE 1

A polycarbonate having a weight-average molecular weight of about 20,000, calculated as styrene, was dissolved in methylene chloride to prepare a 20% by weight solution. The solution was coated on a glass plate by means of a doctor blade to obtain a 15 μm-thick sheet. Under the same conditions as in Example 1, the sheet was irradiated with linearly polarized light to make an optical compensation sheet. As in Example 1, the triaxial indices of refraction and the direction of the optic axis were determined. The results are set out in Table 1.

COMPARATIVE EXAMPLE 2

A polycarbonate having a weight-average molecular weight of about 20,000, calculated as styrene, was dissolved in methylene chloride to prepare a 25% by weight solution. The solution was coated on a glass plate by means of a doctor blade to obtain a 174 μm-thick sheet. The sheet was compression-molded at 160° C. to make a 150 μm-thick optical compensation sheet. As in Example 1, the triaxial indices of refraction and the direction of the optic axis were determined. The results are set out in Table 1.

COMPARATIVE EXAMPLE 3

A polycarbonate having a weight-average molecular weight of about 120,000 was dissolved in methylene chloride to prepare a 25% by weight solution. The solution was coated on a glass plate by means of a doctor blade to obtain a 90 μm-thick sheet. The sheet was uniaxially stretched at 115° C. and a stretch ratio of 135% to make a 74 μm-thick optical compensation sheet. As in Example 1, the triaxial indices of refraction and the direction of the optic axis were determined. The results are set out in Table 1.

TABLE 1

| | $n_1$* | $n_2$ | $n_3$ | $(n_2-n_3)$ × thickness | Angle of inclination of optic axis |
|---|---|---|---|---|---|
| Ex. | | | | | |
| 1 | 1.576 | 1.596 | 1.596 | 300 nm | 20° |
| 2 | 1.578 | 1.595 | 1.595 | 255 nm | 43° |
| 3 | 1.572 | 1.598 | 1.598 | 390 nm | 71° |
| 4 | 1.575 | 1.596 | 1.596 | 315 nm | 20° |
| 5 | 1.575 | 1.598 | 1.598 | 150 nm | 20° |
| CE. | | | | | |
| 1 | 1.583 | 1.583 | 1.583 | 0 | — |
| 2 | 1.582 | 1.584 | 1.584 | 300 nm | 0°* |
| 3 | 1.588 | 1.592 | 1.592 | 296 nm | 90°* |

$n_1$*: $n_1$ optic axis
CE: Comparative Example
0°*: 0° in the normal direction
90°*: 90° parallel with the surface of the sheet It has also been found that between the angle of incidence and the angle of inclination of the optic axis there is the relation given by the following formula 1. This substantiates that the incident linearly polarized light conforms to Snell's law and the optic axis coincides with the axis of polarization.

Formula 1

$$\text{Angle of inclination of the optic axis} = 90° - \sin^{-1}(n_2/n_1 \sin\theta)$$

where $n_1$ is the refractive index of the layer contiguous to the photoisomerizable substance, and $n_2$ is the refractive index of the photoisomerizable substance.

EXAMPLE 6

Figure 6:
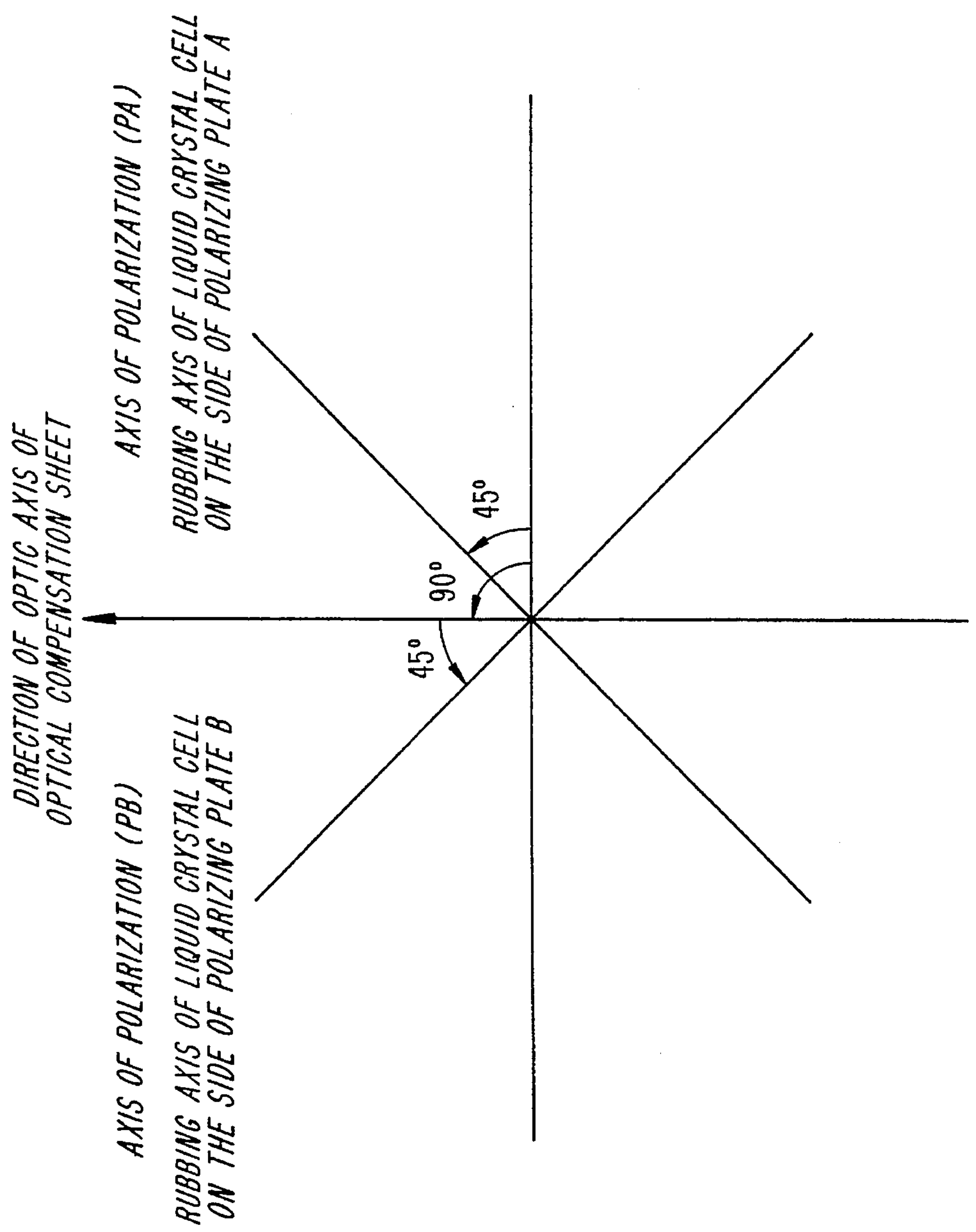
FIG. 6 is an illustration of the device for irradiating a glass substrate having a photoisomerizable substance coated thereon with polarized light.

Each of the optical compensation sheets obtained in the examples and comparative examples was built in a TN liquid crystal cell with a twist angle of 90°, in which the product of a difference in the refractive index of the liquid crystal with respect to ordinary light and extraordinary light and the gap size of the liquid crystal cell was 470 nm, and a 30 Hz rectangular wave of 0 V/5 V was applied to the liquid crystal cell to measure the dependence of contrast on angle by an angle-of-field measuring device (LCD-5000 made by Otsuka Electronics Co., Ltd.). The position of contrast 10 is defined as the angle of field to find the angles of field at the upper-lower and the left-right positions. The results are shown in Table 2. It is here noted that the axis of polarization of the polarizing plate of the TN type liquid crystal cell, the rubbing axis of the liquid crystal cell and the direction of the optic axis of the optical compensation sheet are illustrated in FIG. 6.

TABLE 2

| Type of OCS* | Visual Characteristics | |
|---|---|---|
| | Upper–Lower | Left–Right |
| Ex. | | |
| 1 | 53°–51° | 50°–52° |
| 4 | 52°–50° | 53°–51° |
| 5 | 50°–50° | 55°–53° |
| No sheet | 29°–18° | 33°–36° |
| Comp. Ex. | | |
| 1 | 29°–18° | 33°–50° |
| 2 | 15°–18° | 33°–23° |
| 3 | 10°–15° | 20°–23° |

OCS*: Optical Compensation Sheet

According to the present invention as described above, it is possible to improve the angle-of-field property of a TN type liquid crystal display element, thereby achieving a high definition display element that can provide good-excellent images. Similar excellent effects are obtained even when the present invention is applied to active matrix liquid crystal display devices using three- or two-terminal active elements such as TFTs or MINs.

What we claim:

1. An optical compensation sheet comprising:

at least one photoisomerized substance, said sheet having optical anisotropy and negative uniaxiality with an optic axis of the sheet intersecting the surface of the sheet at an angle other than a right angle.

2. An optical compensation sheet as claimed in claim 1, further comprising a liquid crystalline compound.

3. An optical compensation sheet as claimed in claim 1, wherein the photoisomerized substance includes a low-molecular compound or polymer including a photoisomerizable functional group and wherein the photoisomerized substance has the ability to form a liquid crystal.

4. A method of fabricating an optical compensation sheet comprising the steps of:

irradiating an optical compensation sheet containing at least one photoisomerized substance with linearly polarized light, thereby allowing the sheet to exhibit optical anisotropy, said sheet having negative uniaxiality, with an optic axis of the sheet intersecting a surface of the sheet at an angle other than a right angle, wherein said irradiating step includes obliquely irradiating said sheet containing at least one photoisomerized substance with said linearly polarized light, thereby controlling the angle of the optic axis with respect to a surface of the sheet.

5. A liquid crystal display element including a liquid crystal cell having a liquid crystal sandwiched between two electrode substrates, two polarizing plates located on both sides of the liquid crystal cell, and at least one optical compensation sheet located between the liquid crystal cell and at least one of the polarizing plates, said optical compensation sheet containing at least one photoisomerized substance and having optical anisotropy and negative uniaxiality, with an optic axis of the at least one optical compensation sheet intersecting a surface of the sheet at an angle other than a right angle.

6. A liquid crystal display element as claimed in claim 5, wherein the optical compensation sheet further contains a liquid crystalline compound.

7. A liquid crystal display element as claimed in claim 5, wherein the photoisomerized substance includes a low-molecular compound or polymer including photoisomerizable functional group and wherein the photoisomerized substance has the ability to form a liquid crystal.

* * * * *

UNITED STATES PATENT AND TRADEMARK OFFICE

CERTIFICATE OF CORRECTION

PATENT NO. : 5,583,677

DATED : December 10, 1996

INVENTOR(S) : Yuji ITO et al

It is certified that error appears in the above-indentified patent and that said Letters Patent is hereby corrected as shown below:

Title page, Inventor,
Item [75], kindly add -- Kohei Arakawa --.

Signed and Sealed this

Eleventh Day of February, 1997

Attest:

BRUCE LEHMAN

Attesting Officer

Commissioner of Patents and Trademarks